United States Patent [19]
Lyzinski et al.

[11] Patent Number: 5,186,904
[45] Date of Patent: Feb. 16, 1993

[54] LABORATORY SIMULATOR OF REACTOR FOR A PETROLEUM REFINERY

[75] Inventors: David Lyzinski, Wheaton; Robert D. Buttke; James L. Taylor, both of Naperville; William M. Hall, Batavia, all of Ill.

[73] Assignee: Amoco Corporation, Chicago, Ill.

[21] Appl. No.: 397,390

[22] Filed: Aug. 23, 1989

[51] Int. Cl.$^5$ .............................................. B01J 19/00
[52] U.S. Cl. ..................... 422/130; 208/143; 208/146; 208/157; 417/420; 422/140; 422/143
[58] Field of Search ....................... 422/130, 140, 143; 208/143, 146, 157; 417/420

[56] References Cited

U.S. PATENT DOCUMENTS

| | | | |
|---|---|---|---|
| 4,111,614 | 9/1978 | Martin et al. | 417/420 |
| 4,556,537 | 12/1985 | Honma | 422/130 X |
| 4,559,132 | 12/1985 | Kuehler | 208/158 X |
| 4,684,456 | 8/1987 | Van Driesen et al. | 208/143 |
| 4,753,721 | 6/1988 | McDaniel et al. | 208/143 |
| 4,902,407 | 2/1990 | Chan et al. | 208/146 X |

OTHER PUBLICATIONS

Industrial and Engineering Chemistry, vol. 57, No. 4, Apr. 1965, "Micropiloting", pp. 61-63.

Primary Examiner—Robert J. Warden
Assistant Examiner—Timothy M. McMahon
Attorney, Agent, or Firm—Scott P. McDonald; Richard A. Kretchmer; Frank J. Sroka

[57] ABSTRACT

A laboratory instrument provides a small model reactor which better simulates a back mixed reactor containing a catalyst. The reactor is especially valuable for simulating commercial scale hydrotreating of petroleum resid, coal, and other non-distillable hydrocarbons to obtain some distillable products. An important feature is a magnetically driven pump completely enclosed within the reactor shell of the simulator. All embodiments provide a high temperature and pressure, low liquid to catalyst volume, model reactor where an entire process is carried out within the simulator shell under substantially the conditions prevailing in the full scale reactor.

17 Claims, 4 Drawing Sheets

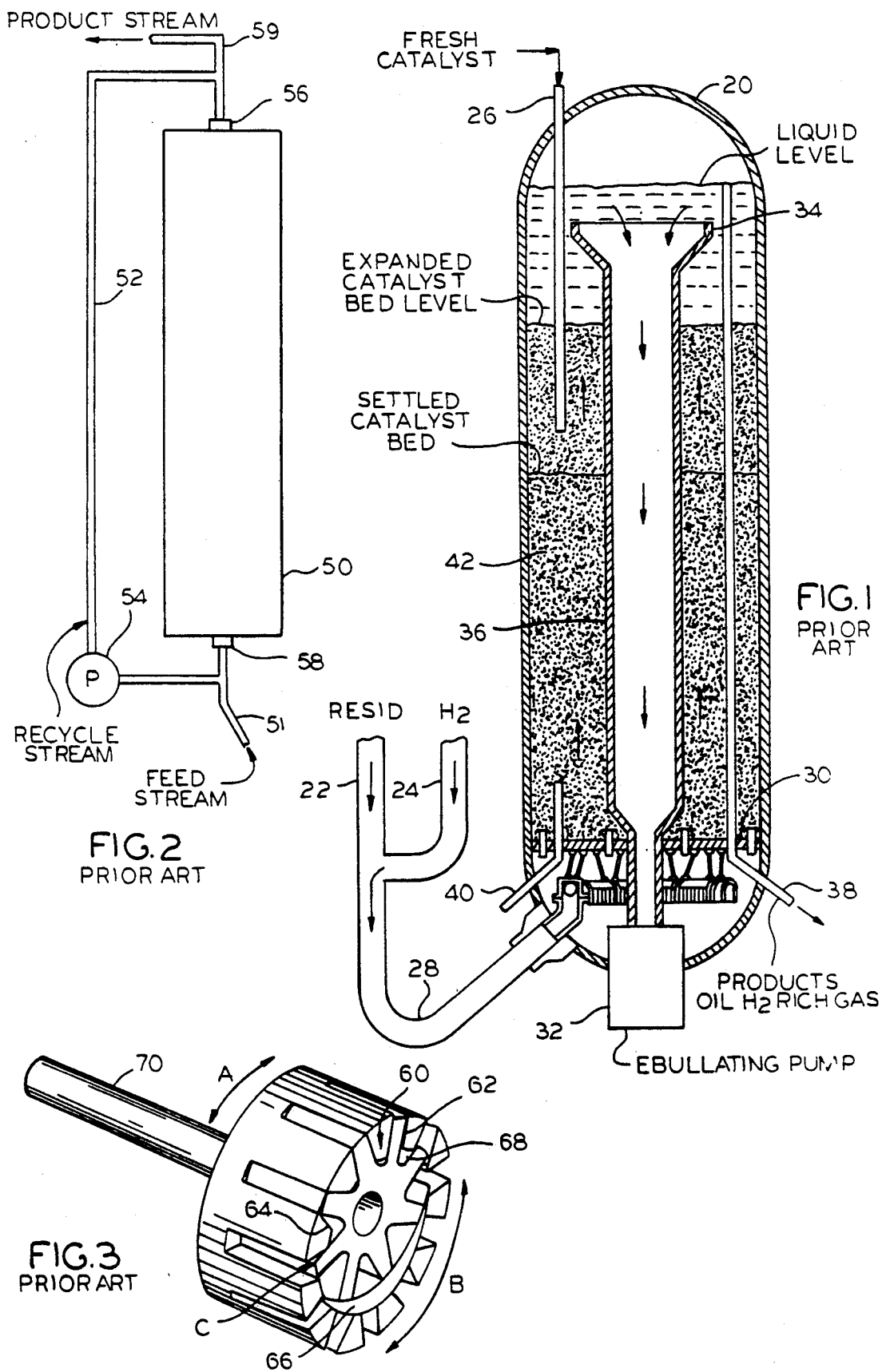

LABORATORY SIMULATOR OF REACTOR FOR A PETROLEUM REFINERY

This invention relates to laboratory instruments and more particularly to instruments for simulating and piloting reactors used in a petroleum refinery—especially, although not exclusively, an ebullated resid hydrotreating reactor.

For convenience of expression, terms such as "resid", "petroleum" or "oil" will be used hereinafter. However, as those skilled in the art know, there are a number of carbonaceous materials which may be included with these terms. Therefore, these terms are to be construed as including all suitable carbonaceous materials such as those in the group consisting of resid oil, a petroleum fraction having a boiling point of at least 650° F., coal liquids, coal, bitumen, tar sands oil, and shale oil.

Refining units have been built without pilot plant reactors. However, such construction often leads to inefficiencies and failure to attain the desired designs and product output.

Reference may be made to U.S. Pat. No. 4,753,721 for an example of a petroleum refinery reactor which the inventive instrument may simulate. This patent shows a resid refining unit, wherein an ebullating or expanded bed reactor may be in the order of six or seven stories tall. In this large dimension, it is possible to build many things into the reactor which can not be exactly duplicated in prior art laboratory instruments. The cost of such a refining unit is measured in the hundreds of millions of dollars. When it is necessary or desirable to design or to improve such a refining unit, it should be possible to test processes, theories, practices, and procedures in a laboratory on a small model simulation of the refining unit, before the hundreds of millions of dollars are committed to construction.

However, in the past, only an approximation of an ebullated bed hydrotreating unit has been available prior to a commitment of substantial sums to actual construction. This led to a need for a long and expensive trial and correction period after construction and before a full on-stream refinery operation was attained at design efficiency.

By way of example, U.S. Pat. No. 4,753,721 explains that the refinery uses ebullating bed reactors to process 1000+° F. oil. However, it has not been possible to make a small model ebullated bed reactor which could perform the entire reactor process at actual operating conditions. Accordingly, the laboratory practice has been to heat and cool a product stream in a small model refining unit so that the stream was about 700° to 900° F. where the oil was in contact with the catalyst and about 350° F. where the oil was in contact with a recycle pump. Then, the test results taken at such varying temperatures have been extrapolated in an effort to predict what would happen in the full scale reactor where all processing is carried out at actual operating conditions.

One of the difficulties with heating and cooling the product stream has been that the cooling has precipitated some components out of the product stream, thereby changing its chemical composition. As a result, the product stream in the laboratory model became significantly different from the product stream in the full scale refinery. Also, the precipitated products tend to dissolve slowly which leads to a failing of the process equipment. This limits the temperature range of the model reactor to a level below that of a full scale ebullated bed reactor. These differences make it difficult to simulate operation in a full scale ebullated bed reactor. Of course, many other problems also confront one who attempts to build a small model refining unit or otherwise simulate a full scale ebullated bed reactor.

A number of prior art back-mixed reactors have been suggested for simulating commercial hydrotreating reactors, such as those of Berty, Carberry, Robinson-Mahoney; see for example J. J. Carberry, *Catalysis Reviews*, Vol. 3, pp. 61 et seq. (1961).

In most prior art back-mixed laboratory reactors, the catalyst is placed in a basket and the liquid phase is agitated by the motion of a basket or an impeller. Using these designs, it is generally not possible to simulate in a laboratory model reactor the ratio of catalyst to liquid volumes which actually appear in a full scale ebullated bed reactor for resid hydrotreating, which is a very significant factor affecting the yield of distillable liquids relative to the extent of upgrading of the liquids.

Accordingly, an object of this invention is to provide new and improved small laboratory models of full scale petroleum refining ebullated bed reactors, which better simulate the processes occurring in a full scale refining unit. In particular, an object is to simulate the full scale commercial operations of an ebullating bed reactor of a resid hydrotreating unit within a laboratory reactor, without having to either cool or reheat the product stream before a completion of an entire processing of the product stream, as well as to predict various operating conditions and product states based upon changes in the feedstock composition, catalyst properties, and other conditions.

Another object of the invention is to provide a laboratory model which can simulate full scale refinery reactor temperatures, gas pressures, and flow rates. Yet another object is to maintain a volume of catalyst to volume of reactor fluid ratio in a laboratory model reactor which prevails in a full scale ebullated reactor. Furthermore, it is desirable to prevent coking problems which have often plagued prior art laboratory reactors.

Another object of the invention is to operate reactors in the 1000-4000 pound per square inch range of hydrogen pressures.

In keeping with an aspect of the invention, these and other objects are accomplished by a model reactor hoiusing entirely containing a pump which can operate at full scale ebullated bed reactor temperatures. An internal recycle pump and loop is also contained within the model reactor housing so that the liquid and gaseous streams in the laboratory reactor may be maintained at full scale commercial reactor temperatures and pressures without requiring any extraneous cooling and reheating during a refining process.

Preferred embodiments of the inventive laboratory scale model reactor are shown in the attached drawing wherein:

FIG. 1 shows an ebullating bed reactor of a full scale ebullated bed reactor or refining unit which is described in U.S. Pat. No. 4,753,721;

FIG. 2 schematically shows a prior art laboratory scale model reactor simulator which was supposed to simulate the reactor of FIG. 1;

FIG. 3 shows a gear pump which is used inside the inventive scale model reactor;

Figure 4:
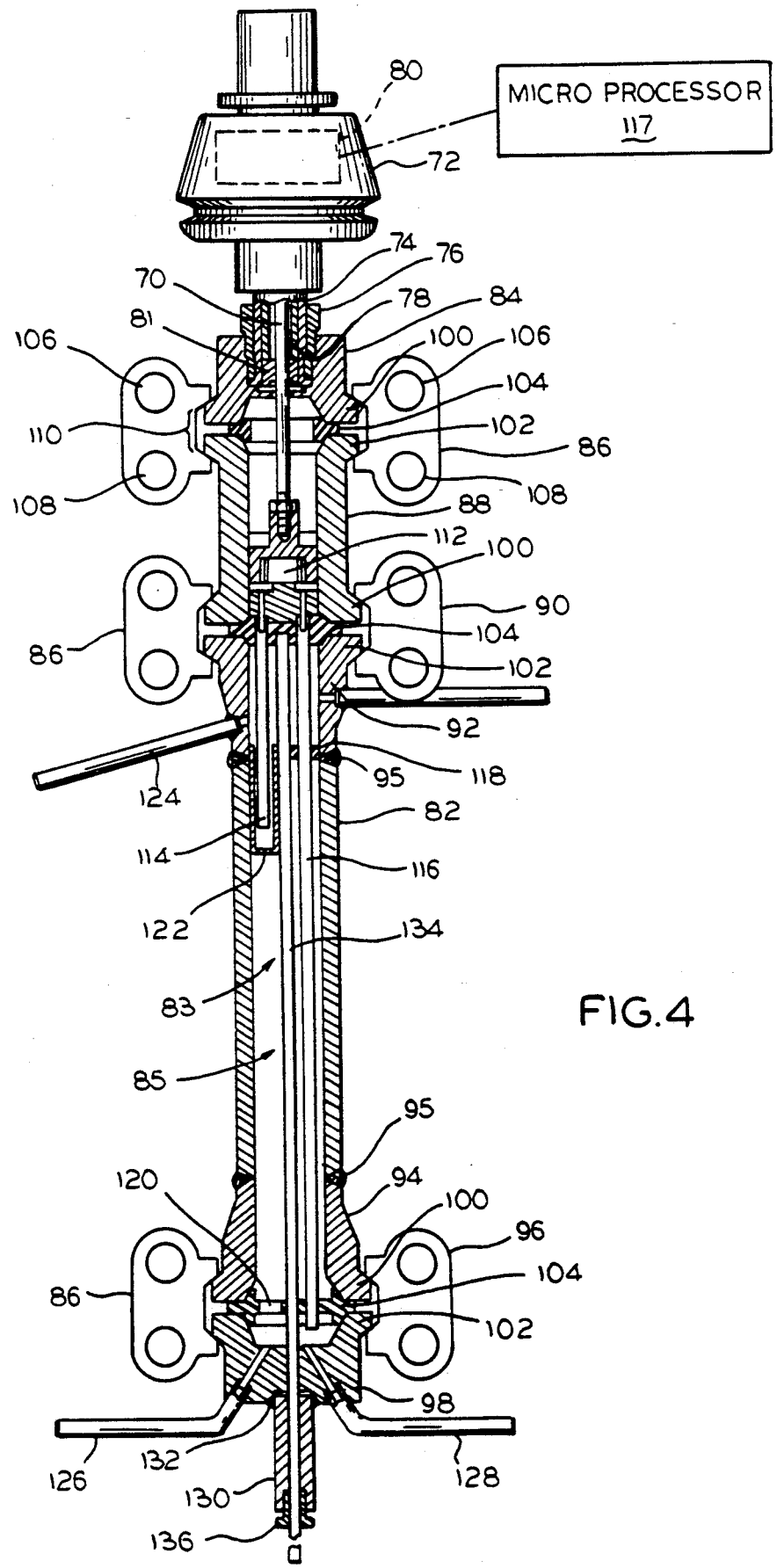
FIG. 4 is a cross section of a first embodiment of an inventive small model, laboratory reactor simulator.

FIG. 1 shows a full scale ebullated bed reactor 20, taken from U.S. Pat. No. 4,753,721, which discloses a system for processing a high-sulfur resid oil stream, also known as vacuum-reduced crude, residual oil, or unhydrotreated virgin resid. The reactor 20 operates continuously at 600° F. to 1000+° F. to process resid fed at inlet 22 into the hydrotreating reactor 20, along with a hydrogen-rich gas which is introduced at inlet 24.

In the reactor 20, the resid is hydroprocessed (hydrotreated) in the presence of hydrogen and of a fresh or equilibrium hydrotreating catalyst in order to produce an upgraded effluent product stream, leaving a used and spent catalyst. Demetalation may occur in the first or subsequent ebullated bed reactors. Desulfurization may occur in any of many cascaded ebullated bed reactors in a train of reactors.

Fresh hydrotreating catalyst may be fed downwardly into the top of the ebullated bed reactor 20 via a fresh catalyst feed line 26. A hot resid feed and hydrogen-containing feed gases enter the bottom of the ebullated bed reactor through a common feed line 28 within a plenum chamber positioned in the interior of the bottom portion of the ebullated bed reactor. The oil and gas feed are mixed and blended in a homogeneous manner to distribute the oil and gas in a uniform flow pattern.

The uniform homogeneous mixture of oil and gases flows upwardly through a grid which helps further to distribute the oil and gas across the reactor and to prevent the catalyst from falling into the bottom section of the reactor. An ebullating pump 32 circulates oil from a recycle pan 34 through a downcomer 36 and the grid 30. The circulation rate is sufficient to lift and expand the catalyst bed from its initial settled level to its steady state expanded and ebullating level. The effluent product stream of hydrotreated oil and hydrogen-rich tail gases (off gases) is withdrawn from the reactor 20 through an effluent product line 38.

Catalyst particles are suspended in a mixture of oil, and hydrogen-rich feed gases in the reaction zone 42 of the reactor. Typically, hydrogen-rich gases continually bubble through the oil. The random ebullating motion of the catalyst particles results in a turbulent mixture of the phases which promotes good contact mixing and minimizes temperature gradients.

It should be noted that, during the processing, it is necessary to circulate and recirculate the product liquid stream within the reactor 20. More particularly, the product stream enters at 28, rises through the catalyst bed 42, overflows into downcomer 36, and once again rises through the catalyst bed 42. When elements in the product stream are displaced by incoming feed they exit through the effluent product line 38, and are discharged as the finished product output.

The reactor 20 operates at a hydrotreating temperature of 600° F. to 1000+° F. and at a specific volume ratio of catalyst to liquid. All of the equipment in reactor 20 is specifically designed to reach and remain at the hydrotreating temperature and pressure. The product stream never cools or reheats from the time when it first enters at inlet 28 until it exits at 38. Therefore, in the full scale reactor 20 of FIG. 1, nothing precipitates out of the product stream as a result of heating, cooling and reheating during processing.

The full scale resid hydrotreating reactor of FIG. 1 is quite flexible. If desired, the same catalyst may be fed into one or more of the reactors or a separate demetalation catalyst may be fed into a first reactor while a different catalyst may be fed to the second or third reactors. Alternatively, different catalysts may be fed into each of the reactors. Typically, the spent catalyst contains nickel, sulfur, vanadium, and carbon (coke). A laboratory model reactor should be equally flexible.

In the past, when an effort has been made to simulate or duplicate full scale reactor 20 as a laboratory model reactor 50 (FIG. 2), it has not been possible to carry out all of the process at the same high temperature and pressure. For example, conventional, commercially available laboratory pumps have not been able to operate at temperatures greater than about 400° F. Thus, the recycle stream 52, providing an equivalent of downcomer 36, has been outside the reactor. When a model reactor simulator 50 has an external recycle loop 52 including pump 54, a partially processed resid oil product effluent is taken from the reactor at outlet 56. While the recycle effluent is in the feed pipe 52, it is cooled to the 400° F. which may be tolerated by pump 54, thereby causing some elements in the recycle effluent to precipitate out of the feed stream. The effluent is reheated before or as it is reintroduced into the reactor at inlet 58. Therefore, when the pump 54 returns the effluent to the reactor 50, the composition of the product stream is no longer what it was when it was taken from the outlet 56 or what it will be in the full scale commercial reactor. Also, the recycle section including line 52 may be fouled (clogged).

Heretofore, the usual laboratory procedure has been to extrapolate from data taken at the scale model reactor simulator 50 of FIG. 2 in order to estimate how the full scale reactor 20 of FIG. 1 would behave if none of the effluent were ever cooled during the processing. Also, in model reactor simulator (laboratory reactor) 50, the volume of liquid in line 52 typically contains no catalyst, so reactions occurring here are not representative of the full scale ebullated bed reactor 20. The extrapolation has not been as accurate as it should and would be if cooling and reheating had not occurred in recycle loop 52 and at pump 54 and if non-representative reactions had not occurred.

Another problem is that the approach of FIG. 2 leads to small model reactors simulators 50 which are much larger than they have to be. For example, the reactor 50 might be in the order of 8-feet or so tall. There have been many other and similar practical problems when spent catalyst is removed and new catalyst is charged into reactor 50. If laboratory technicians have to remove and handle the reactor 50, as for cleaning, recharging, repair or maintenance, it is so large and heavy that a great physical effort is required.

According to the invention, a model reactor simulator (laboratory reactor) includes everything within a non-magnetic shell so that there never is any need to cool or reheat any part of the product stream. An internal recycle pump enclosed within the reactor shell is magnetically driven from outside the shell so that the high temperature and pressure of a full scale reactor may be maintained without requiring a penetration of the reactor shell to operate the pump. Further, according to the invention, the interior of the reactor and parts therein may be accessed from the top so that the fluids at the bottom of the reactor do not drain out during maintenance. The inventive reactor simulator size has been scaled down to the order of 1 to 2 or 3 feet tall.

A pump which may operate efficiently at 700° F. to 900° F. is shown in FIG. 3 as including an outer gear 60 and an inner gear 62. This pump is a commercially available product which is usable at high temperatures which occur within the reactor. The two gears are not concentrically mounted with respect to each other so that they turn about offset axes. As a result, the gear teeth are completely intermeshed on one side A and completely separated on another side B. At point C, a cavity 64 is beginning to open between the teeth and to draw (suck) in ambient fluid. As the cavity becomes larger, the teeth of the inner gear 62 pass behind a shroud 66 to retain the fluid that is drawn into the cavities at point C. As the gear teeth enter meshing zone A, the cavities begin to close, as shown at 68, thereby forcing the fluid out of the cavities.

Since this pump is made entirely of an appropriate metal, it may easily withstand the 700° F. to 900° F. temperature and the high pressures that may be encountered in a reactor. Moreover, the shaft 70 may be rotated in response to a turning magnetic field outside the reactor shell so that the pump may be completely enclosed within the walls of the reactor shell. Since the shaft does not penetrate the shell wall, there is no need for any seals about turning shaft 70, at any point on the reactor wall.

A first embodiment of the inventive small model, laboratory reactor simulator is shown in FIG. 4, which is a reactor that is, roughly speaking, about two feet tall. At the top of the reactor simulator, a magnetic drive is arranged to turn the pump in response to an external rotating magnetic field without requiring a penetration of the reactor shell.

In greater detail, a non-magnetic (such as stainless steel) housing 72 is integrally joined to a pipe 74 which, in turn, is joined to the laboratory reactor by a suitable gland 76 and a suitable packing 78. Therefore, the interior of housing 72 is at about the same pressure, temperature, and environment that prevails inside the reactor shell. The housing 72 contains a magnetic drive 80 for turning shaft 70 of the pump 112 (also shown in FIG. 3). There are little or no differential temperatures and pressures so that all equipment inside housing 72 can withstand the prevailing reactor pressure, temperature, and environment. A suitable shaft bearing 81 supports the pump shaft. The magnetic drive is mounted outside the heated reaction zone 83 to isolate the drive from the hydrotreating temperatures and pressures of the reaction zone. Thus, there are none of the problems which were associated with pump 54 (FIG. 2) of prior laboratory model reactor simulators.

The magnetic drive 80 is rated to be operative up to 6000 psi and 650° F. This rating is more than adequate for a model reactor. In one case, an Autoclave Engineers "Magnadrive II", Model No. 1.5001AS06C was used. Other suitable drives can be used.

Advantageously, the laboratory reactors of this invention reasonably simulate the actual operating conditions of a full scale commercial ebullated bed reactor, such as those operated at the Amoco Oil Company Refinery at Texas City, Tex.

The main element of the reactor shell or body is a seamless pipe 82 that may be made in any suitable length and diameter. The catalyst is located in a catalyst bed 85 in the reaction zone 83. The seamless pipe 82 was six and three-quarters inches long and 1.503 inches inside diameter, in one embodiment. The remainder of the reactor shell was made of commercially available units 84-98 which are sold under the trademark "Grayloc". The units 84, 98 are known as hubs; units 92, 94 as butt weld hubs; and unit 88 as a spool piece. The butt weld hubs 92, 94 are welded at 95, 95 to opposite ends of pipe 82.

Each of these Grayloc units has a flaring end flange 100, 102 which may be placed in an end-to-end confrontation with a suitable seal ring therebetween, as shown at 104. While in this position two semicircular clamps 86 may be positioned on opposite sides of the flanges 100, 102 to completely surround them. The inside diameters of the clamps have a groove 110 with a somewhat triangular frustum cross section which is complementary to the shapes of the confronting flanges. Bolt holes 106, 108 on opposite ends of the semi-circular clamps enable them to be bolted together. As the two clamps are drawn together by tightening the bolts in the bolt holes 106, 108, the end flanges 100, 102 are wedged together and against sealing ring 104 by the closing of grooves 110. Other types of fasteners and closures may be used, if desired.

The resulting structure is a reactor shell which is a miniature version of a hydrotreating reactor. The shell may be completely disassembled and reassembled whenever one wishes to replace the catalyst, or wishes to build and test new internal reactor structures, or wishes to have ready access to the interior of the reactor for any other reason.

Inside the reactor shell, an internal recycle pump means 112 causes a suction at the top of pipe 114 and pressure at the top of pipe 116, thereby causing a portion of the product stream within the reactor shell to flow up pipe 114, cross over through the pump, and flow down pipe 116 for circulating and recirculating (recycling) the product stream vertically through the catalyst bed. After the fluid reaches the bottom of pipe 116, it passed upwardly through the catalyst bed 85. The speed and amount of recirculation of the product stream may be selected and controlled by selecting and controlling the pump speed. The selection and control may be carried out under the control of a microprocessor 117 or other suitable means.

Internal screens at 118 and 120 set off a reaction zone or area of the reactor shell for containing a catalyst between them. The preferred heterogeneous hydrotreating catalyst has a consistency which is somewhat similar to pellets or a very coarse sand. A well 122 in the form of a pipe with a closed end is located around the intake end of pipe 114 to keep the catalyst from entering the pump.

The fluid within the reactor rises through screens 120, 118 and overflows into the well 122 from which a portion of it is pumped through pipes 114, 116 back to the bottom of the reactor so that it may rise again through the catalyst. This circulation and recirculation (recycling) continues until at least a portion of the fluid is displaced by the feed entering feed line 126, with the displaced fluid (product) exiting through overflow product outlet line 124, from which it is discharged.

The input oil feed stream flows into the reactor shell via an intake oil feed line or pipe 126. A stream of hydrogen gas and/or light hydrocarbon gases can be fed into the reactor shell via a gas feed line or pipe 128. Alternatively, the hydrogen-containing feed gas (hydrogen and/or light hydrocarbon gases) can be combined (mixed) and fed with the oil feed through the oil feed line 126.

Thus, the internal recycle pump provides a means for back mixing the oil feed and gas while in the presence of the catalyst and under a catalyst to liquid ratio and at a pressure and temperature substantially similar to a ratio, pressure, and temperature used in said full scale reactor.

A nipple 130 is welded at 132 to the Grayloc hub 98 in order to receive any suitable sensors, instrumentation, or the like. In this particular embodiment, the sensor is a thermocouple inside a stainless steel tube 134, which is held in place by a gland 136 which is threaded into nipple 130. In one embodiment, a thermocouple in a thermowell was used to measure internal reactor temperature.

A most attractive feature of the embodiment of FIG. 4 is that a laboratory technician may build and rebuild the reactor any number of times with a maximum flexibility of design choices. Thus, this embodiment is a most attractive vehicle for catalyst evaluation.

A second embodiment of a laboratory model reactor simulator (FIG. 5) is similar to the first embodiment of FIG. 4. Since the same reference numerals are used to designate the same parts, they will not be explained a second time.

The upper hub 84 has a dependent nipple 140 joined thereto at welds 142. The upper hub may also be threaded or clamped. The lower part of this nipple 140 is threaded at 144 to receive a dependent tube 146. The outside diameter of tube 146 is slightly smaller than the inside of tube 82 so that it slides therein, with a telescoping motion. The intake pipe 114 is permanently attached to the assembly 156. Below pump 112 is a slip joint 150 which slides over and makes a connection with the discharge pipe 116.

Therefore, when the bolts are removed from bolt holes 106, 108, the two semi-circular clamps 86 may be pulled away from flanges 100, 102. Then, the top of the reactor shell may be pulled upwardly and tube 146 slides out of tube 82. The discharge pipe 116 is disconnected from the pump at slip joint 150. Thus, the entire pump assembly 152 may be lifted off and cleaned, repaired, or replaced, as may be required; or catalyst can be replaced or added to the reaction zone 83.

Also, while the pump assembly 152 is removed, there is access to the upper interior of the reactor shell. If, for any reason, it is necessary to replace pump 112 or the slip fitting 150, two or more hex head socket screws 152, 154 may be removed so that the block 156 may be lifted off.

Figure 5:
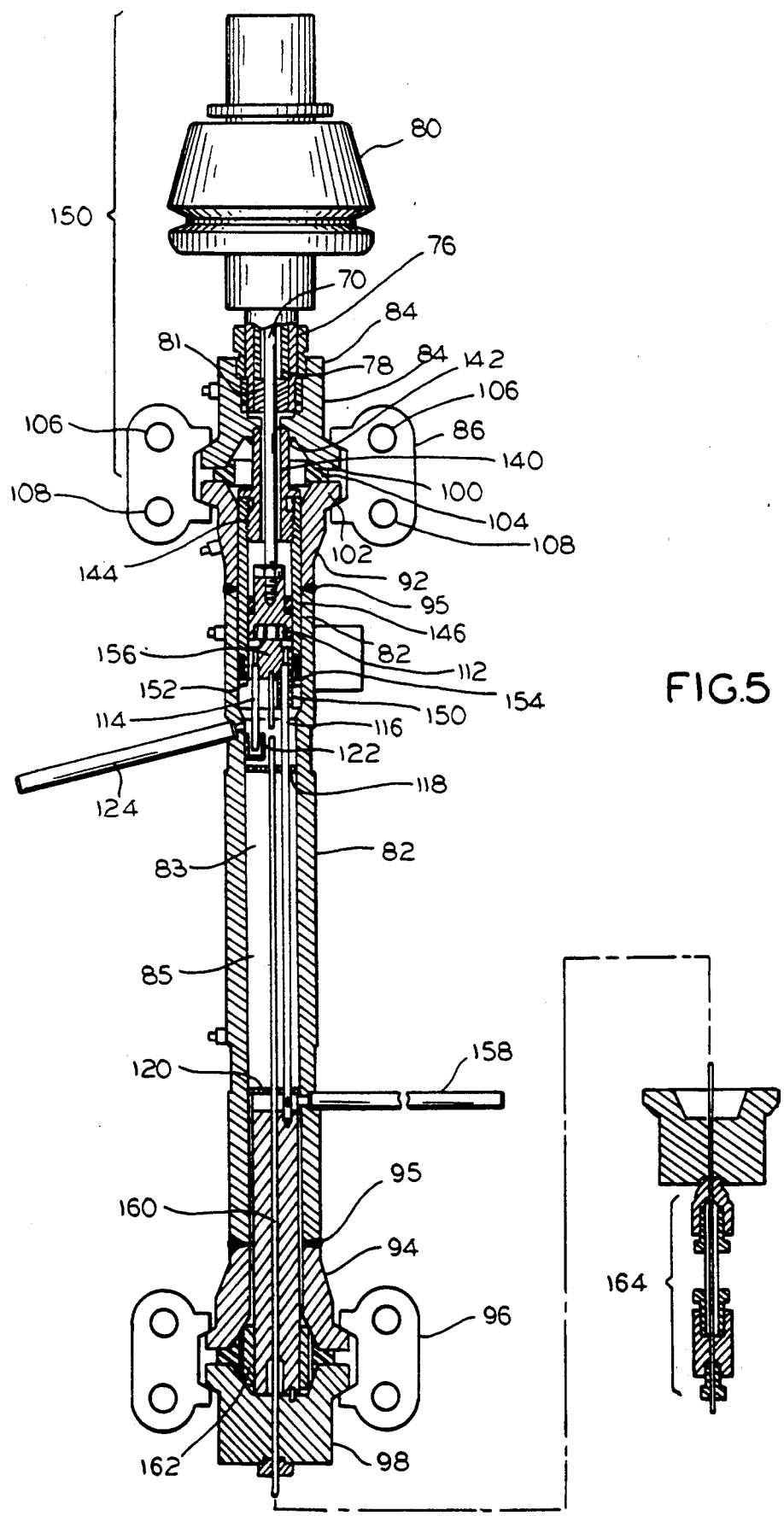
FIG. 5 is a cross section of a second embodiment of a small model, laboratory reactor simulator especially designed for easy assembly and disassembly with provisions for attaining greater temperature stability.

Another difference between the embodiments of FIGS. 4, 5 is the combining of the oil fill inlet 126 and hydrogen purge tap 128 into a single input 158. This makes the intake into the reactor shell of FIG. 5 a little more like the inlet 50 in U.S. Pat. No. 4,753,721.

A deadman spacer 160 in the form of a metal element has been added in the bottom of the second embodiment reactor shell (FIG. 5) in order to provide greater thermal stability. The spacer 160 is held in place by a collar 162 designed to fit into a space provided for that purpose in the Grayloc elements 94, 98. Therefore, if the clamp 96 is removed, the spacer 160 simply slides out. The spacer 160 helps isolate the reaction zone 83 from the Grayloc closure 96 which can liberate heat rapidly. Thus, the spacer 160 serves to keep the catalyst bed 85 at the desired temperature. Also, removal of the spacer 160 gives access to the lower interior of the reactor shell.

Another modification found in FIG. 5 as compared to FIG. 4 is the use of Autoclave Engineers "Slimline" hardware 164 which makes it easier to change or replace thermowells used inside the reactor.

Figure 6:
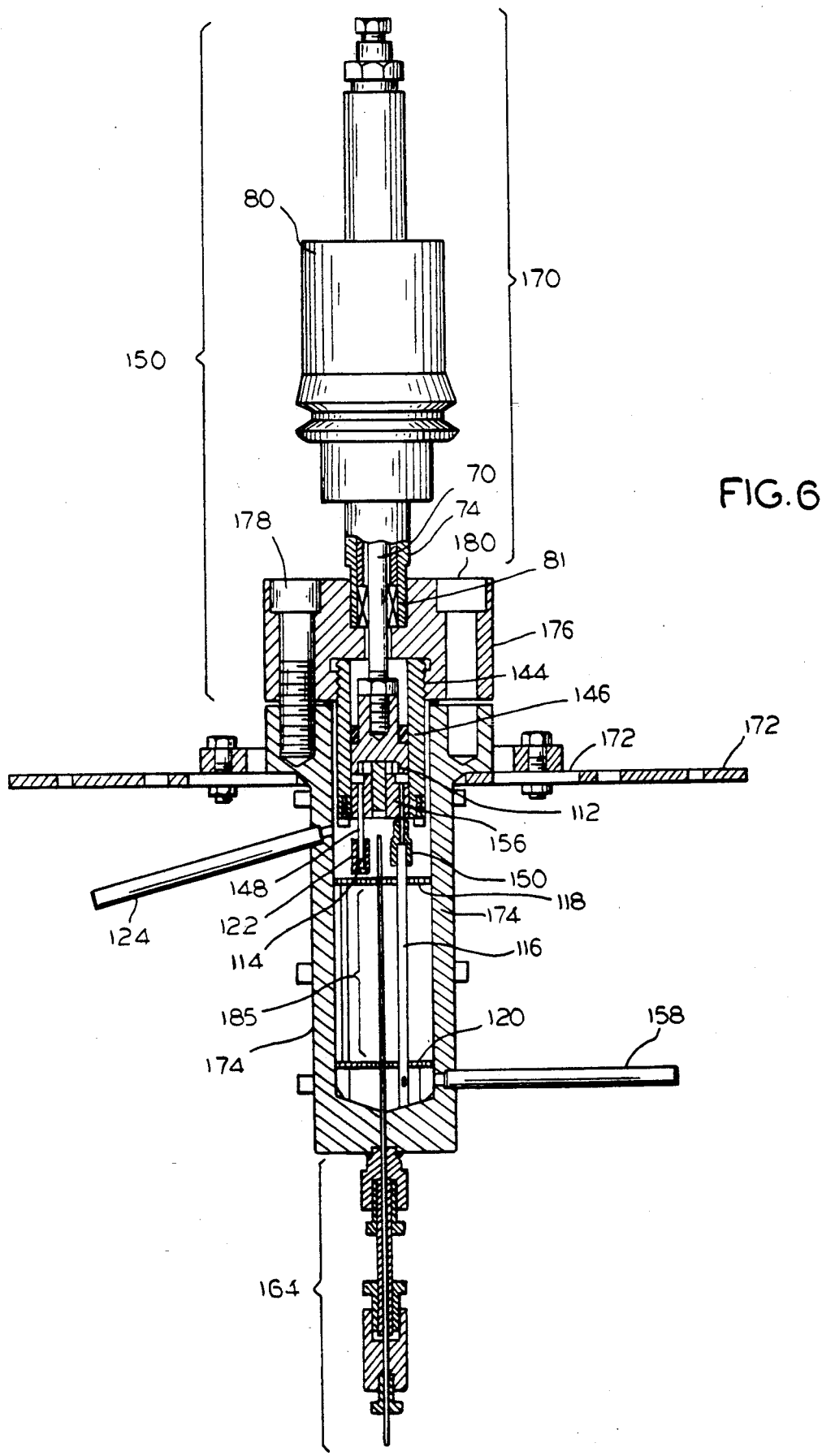
FIG. 6 is a cross section of a third embodiment of a small model, laboratory reactor simulator.

FIG. 6 shows yet another embodiment of the inventive laboratory model reactor simulator which is a modified commercial product sold under the commercial designation Autoclave Engineers 300 c.c. stirred autoclave Model BC0030SS05AH which may be purchased with a magnadrive.

This is the smallest of the three embodiments having an overall reactor height in the nature of ten and three-eighths inches, plus the heights of the magnadrive 170 and thermowell assembly 164. The entire unit is mounted on a support plate 172. The autoclave housing 174 has been modified by an addition of an intake tube 158 and outlet or overflow tube 124.

Those elements in the embodiment of FIG. 6, which have already been explained in connection with the embodiments of FIGS. 4 and 5, have been given the same reference numerals and will not be explained again.

The element 146 extends from mounting head to the slip joint 150 so that it may lift or slide away from the flange of the autoclave housing. The sliding element is held in place by at least two hex head cap screws 178, 180 which are tightly drawn to approximately 40–50 foot/pounds of torque.

The catalyst fills catalyst bed (space) 185 between upper and lower screens 118, 120.

In each of the three embodiments, means are provided for feeding and removing catalyst from the reactor zone. More particularly, in FIG. 4, the "Grayloc" clamps 86, 90 are removed. The upper sections 72, 88 are lifted off, as a unit, and a measured amount of catalyst is either implaced or removed from the reaction zone 83. In the embodiment of FIG. 5, the "Grayloc" clamp 86 is removed and the upper unit is pulled so that tube 146 may be slid out of tube 82, after which catalyst may be added to or removed from reactor zone 83. In the embodiment of FIG. 6, the hex head cap screws 178, 180 are removed. Unit 146 is removed and catalyst is added to or removed from the reactor zone 185. After the correct amount of catalyst is in place, the process is reversed and the small model reactor is reassembled, to the form shown in the several figures.

In operation, the three embodiments can operate substantially similar to a full scale commercial ebullated bed reactor of a resid hydrotreating unit. Therefore, the procedures and process that are followed in the inventive laboratory model will not be described in detail. The experimenter may vary the catalysts, temperature, pressure, ratio of catalyst to liquids, etc. and know that the laboratory results will be substantially duplicated when they are adopted in the full scale refinery.

Those who are skilled in the art will readily perceive how to modify the invention. Therefore, the appended claims are to be construed to cover all equivalents which fall within the true scope and spirit of the invention.

The claimed invention is:

1. An ebullated bed laboratory reactor for simulating a process and operating conditions of a full scale ebullated bed reactor in a petroleum refinery having a feed for oil and hydrogen containing gas, said laboratory reactor comprising:

a reactor shell means assembled from a plurality of housing parts for providing a reaction zone and for enabling an emplacement of catalyst into and removing and replacing catalyst from said reaction zone by at least partially disassembling and reassembling said housing;

feed means connected to said reactor shell for feeding oil and a hydrogen-containing gas to said reaction zone at a particular rate which substantially simulates a corresponding rate at which said oil and gas is fed into a full scale ebullated bed reactor;

internal recycle displacement pump means operatively positioned within said reactor shell for substantially back mixing said oil feed and said gas in a presence of said catalyst, under a catalyst to liquid ratio fluid displacement and at a pressure and temperature substantially similar to a ratio, pressure, and temperature used in said full scale ebullated bed reactor in order to produce upgraded oil and product gases; and a product outlet line connected to said reactor shell for removing said upgraded oil and said product gases from said shell.

2. The laboratory reactor of claim 1 wherein said plurality of housing parts which may be assembled to form a reactor shell comprises:

a plurality of pipe-like segments joined together to form a miniature model for providing internal conditions which are a simulation of corresponding conditions prevailing in a full scale ebullated bed hydrotreating reactor, with said internal recycle pump means located at a top of said model;

said oil comprises a carbonaceous material selected from the group consisting of resid oil, a petroleum fraction having a boiling point of at least 650° F., coal liquids, coal, bitumen, tar sands oil, and shale oil; and said catalyst comprises a hydrotreating catalyst.

3. The laboratory reactor of claim 1 wherein said pump means comprises a positive displacement pump.

4. The laboratory reactor of claim 1 wherein said pump has drive means extending outwardly of said shell and spaced from said reaction zone for substantially isolating said drive means from said pressure and temperature of said reaction zone.

5. The laboratory reactor of claim 4 wherein said drive means comprises a magnetic coupling drive.

6. The laboratory reactor of claim 1 including a pair of screen means partitioning an interior of said assembled housing to contain a top and bottom of a bed of said catalyst.

7. The laboratory reactor of claim 1 including catalyst spacer means within said shell positioned away from said reaction zone for containing a top and bottom of a bed of said catalyst and for enhancing the thermal stability of said reaction zone.

8. The laboratory reactor of claim 1 wherein said pump means comprises a magnetically driven pump, a recycle line, and at least one slip joint for detachably connecting said recycle line to said pump, all contained within said assembled housing.

9. The laboratory reactor of claim 8 wherein said pump means comprises a displacement gear pump.

10. The laboratory reactor of claim 8 wherein said pump means include speed control means for controlling a rate of said back mixing within said assembled housing.

11. A high temperature and pressure, low liquid to catalyst volume small model simulator for reproducing an approximation of a resid refining process carried out in a full scale ebullated bed resid hydrotreating reactor, said full scale reactor having a temperature and pressure at which reaction is carried out, said simulator comprising a miniature reactor shell containing entirely therein, a plurality of internal parts including at least a pump and magnetic drive means for said pump, and means for controlling an amount of recirculating back mix produced within said simulator by controlling a speed of said pump, whereby an entire refining process is carried out within said miniature shell at the temperature and pressure established therein which substantially simulates the temperature and pressure in a full scale reactor shell.

12. The simulator of claim 11 further comprising means for suspending and containing both a top and bottom of a catalytic bed within said reactor shell for said pump to circulate and recirculate a product feed stream through said catalytic bed.

13. The simulator of claim 12 wherein said miniature reactor shell is assembled from a plurality of shell parts, and means for clamping said plurality of shell parts together in order to form said miniature reactor shell whereby said miniature reactor shell may be disassembled to provide easy access for catalyst replacement inside said shell.

14. The simulator of claim 12 wherein said suspending and containing means further comprises catalyst spacer means inside said shell for helping to maintain thermal stability within said shell.

15. The simulator of claim 12 further comprising means for sliding said internal parts of said reactor into said miniature shell whereby said internal parts within said shell may be replaced by slidingly removing and replacing said sliding parts.

16. A miniature laboratory reactor for simulating a process of a full scale ebullated bed reactor, said laboratory reactor having a closed container held in an upright position by a support means; an insert slidably mounted inside said container; said insert including at least a positive displacement pump, a magnetic drive for said pump entirely included within said container so that said pump operates entirely within environmental conditions prevailing within said container while being driven from outside said housing via said magnetic drive; a catalytic bed having a top and a bottom inside said container; means for inserting a feedstream into said container at a point near the bottom of said catalytic bed; means for removing a liquid stream which is derived from said inserted feedstream from said container at a point adjacent the top of said catalytic bed; and means including said pump for drawing at least a part of said liquid stream from above said catalytic bed and for reinserting said part of said liquid stream adjacent the bottom of said catalytic bed, thereby recirculating and back mixing at least said part of said liquid stream with said inserted feedstream.

17. A laboratory reactor for simulating a process and operating conditions prevailing in a full scale ebullated bed reactor in a petroleum refinery, said full scale reactor operating at substantially an internal pressurized and temperature and having a feed by which oil and a hydrogen containing gas are introduced into said full scale reactor in order to maintain a predetermined catalyst to liquid ratio within said full scale reactor, said laboratory reactor comprising:

a reactor shell providing a reaction zone containing a catalyst means, said reactor being a housing that can contain substantially said internal pressure and temperature of said full scale reactor and which can be opened for cleaning and servicing;

means connected to said reactor shell for feeding oil and a hydrogen-containing gas into said reaction zone at a rate which is substantially similar to the corresponding rate used in a full scale reactor;

means positioned within said reactor shell for substantially back mixing said feed of oil and gas in a presence of said catalyst under a catalyst to liquid ratio and at a pressure and temperature which is substantially similar to a corresponding ratio, pressure, and temperature used in said full scale reactor in order to produce upgraded oil and product gases; and means coupled to said reactor shell for removing said upgraded oil and said product gases from said shell.

* * * * *